(12) United States Patent
Cho

(10) Patent No.: US 7,717,009 B2
(45) Date of Patent: May 18, 2010

(54) ROTARY DAMPER

(75) Inventor: Young Kyoung Cho, Gyeonggi-do (KR)

(73) Assignee: Hyundai Mobis Co., Ltd., Seoul (KR)

( * ) Notice: Subject to any disclaimer, the term of this patent is extended or adjusted under 35 U.S.C. 154(b) by 0 days.

(21) Appl. No.: 11/687,829

(22) Filed: Mar. 19, 2007

(65) Prior Publication Data

US 2008/0121479 A1 May 29, 2008

(30) Foreign Application Priority Data

Nov. 28, 2006 (KR) .................. 10-2006-0118494

(51) Int. Cl.
   *F16H 1/04* (2006.01)
(52) U.S. Cl. .................. 74/422; 296/37.8; 188/290
(58) Field of Classification Search .............. 296/37.12, 296/37.8, 37.9; 188/82.1, 290; 74/422, 29; 224/282; 16/82, 231
   See application file for complete search history.

(56) References Cited

U.S. PATENT DOCUMENTS

| | | | | |
|---|---|---|---|---|
| 4,669,328 A | * | 6/1987 | Kishi et al. ................... 74/422 |
| 5,199,777 A | | 4/1993 | Taima et al. |
| 5,449,054 A | | 9/1995 | Wiese et al. |
| 5,460,252 A | | 10/1995 | Kosugi et al. |
| 5,690,194 A | * | 11/1997 | Parker et al. ............... 188/82.1 |
| 5,862,896 A | * | 1/1999 | Villbrandt et al. .......... 188/293 |
| 5,887,930 A | * | 3/1999 | Klein ....................... 296/37.12 |
| 5,971,463 A | * | 10/1999 | Nowak et al. ............... 296/37.8 |
| 6,131,242 A | * | 10/2000 | Zipperle et al. ................ 16/82 |
| 6,298,959 B1 | * | 10/2001 | Willner et al. .............. 188/281 |
| 6,470,627 B2 | * | 10/2002 | Fukuo ......................... 49/260 |
| 6,662,405 B2 | * | 12/2003 | Vitry ........................... 16/355 |
| 6,783,166 B2 | * | 8/2004 | Kato ........................ 296/37.12 |
| 6,932,402 B2 | * | 8/2005 | Niwa et al. ............... 296/24.34 |
| 7,004,527 B2 | * | 2/2006 | Niwa et al. ............... 296/24.34 |
| 7,065,829 B2 | * | 6/2006 | Okabayashi et al. ........... 16/51 |
| 7,125,063 B2 | * | 10/2006 | Kawamoto et al. ......... 296/37.8 |
| 7,234,746 B2 | * | 6/2007 | Sakakibara et al. ...... 296/24.34 |
| 2001/0052524 A1 | * | 12/2001 | Ichimaru et al. ............ 220/815 |
| 2004/0051334 A1 | | 3/2004 | Park |
| 2005/0104401 A1 | | 5/2005 | Kim |
| 2005/0274922 A1 | | 12/2005 | Lee |
| 2005/0275146 A1 | | 12/2005 | Shim |
| 2005/0275236 A1 | | 12/2005 | Kim |
| 2006/0057952 A1 | | 3/2006 | Kim |

FOREIGN PATENT DOCUMENTS

| | | | |
|---|---|---|---|
| JP | 405004549 A | * | 1/1993 |
| JP | 2004154171 | * | 6/2004 |

* cited by examiner

*Primary Examiner*—Richard W L Ridley
*Assistant Examiner*—Matthew A Johnson
(74) *Attorney, Agent, or Firm*—Greenblum & Bernstein P.L.C.

(57) ABSTRACT

A rotary damper includes an operating part mounted in an interior in a vehicle in such a manner that the operating part can be introduced or withdrawn, an operating part case that guides a path of the operating part, a pinion gear mounted to one side of the operating part and a guide rail rotatably mounted to the operating part case such that the pinion gear can be engaged with the guide rail. Further, a separation preventing protrusion is provided at a portion of the guide rail, where the pinion gear starts to move in a curvilinear form, the separation preventing protrusion configured to support an outside surface of the pinion gear.

5 Claims, 3 Drawing Sheets

ROTARY DAMPER

BACKGROUND OF THE INVENTION

1. Field of the Invention

The present invention relates to a damper for controlling the operating speed of an operating part, such as a power outlet or an ash tray, of a vehicle, and, more particularly, to a rotary damper that is capable of uniformly controlling the operating speed of an operating part having a complex track.

2. Description of the Related Art

FIG. 1 is a view illustrating the construction of a conventional damper having a linear track.

When the track of the damper is linear, as shown in FIG. 1, the damper is constructed in a structure in which a pinion gear 12 is mounted to an operating part, and a guide rail 14 is mounted to an operating part case such that the pinion gear 12 can be engaged with the guide rail 14. The interior of the pinion gear 12 is filled with a fluid for uniformly reduce the rotating speed of the pinion gear 12. Consequently, the moving speed of the operating part is controlled using the rotating resistance of the pinion gear 12.

FIG. 2 is a view illustrating the construction of another conventional damper having a complex track.

When the track of the damper is complex, i.e., a moving path 2 of an operating part includes a rectilinear path and a curvilinear path, as shown in FIG. 2, the damper is constructed in a structure in which a pinion gear 22 is mounted to the operating part, and a guide rail 24, with which the pinion gear 22 is engaged, is arranged along the moving path 2 of the operating part.

However, it is very difficult to uniformly maintain a damping force in a section 5 where the rectilinear path and the curvilinear path are connected with each other. As a result, the operating efficiency and the sensitivity of the operating part are deteriorated.

SUMMARY OF THE INVENTION

Therefore, the present invention has been made in view of the above problems, and it is an object of the present invention to provide a rotary damper that is capable of uniformly applying a damping force to an operating part having a complex track, thereby improving the operating efficiency and the sensitivity of the operating part.

In accordance with the present invention, the above and other objects can be accomplished by the provision of a rotary damper including an operating part mounted in the interior in a vehicle in such a manner that the operating part can be introduced or withdrawn, an operating part case for guiding a path of the operating part, a pinion gear mounted to one side of the operating part, and a guide rail rotatably mounted to the operating part case such that the pinion gear can be engaged with the guide rail.

Preferably, the operating part is provided with a guide protrusion for guiding the guide rail such that the guide rail cannot be separated from the pinion gear. More preferably, the damper further includes an elastic member for providing an elastic force in the direction in which the guide rail is brought into tight contact with the pinion gear.

Preferably, the guide rail is provided with a frictional protrusion protruding toward the operating part case. Also preferably, the guide rail is provided with a separation preventing protrusion for supporting the outside surface of the pinion gear.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1:
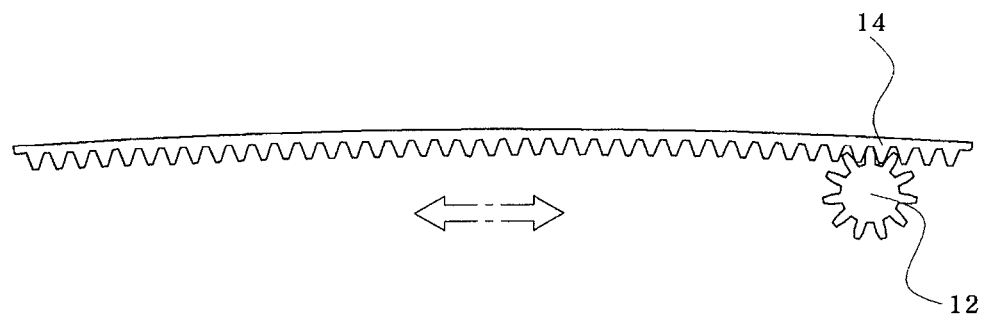
FIG. 1 is a view illustrating the construction of a conventional damper having a linear track.

Now, a preferred embodiment of the present invention will be described in detail with reference to the accompanying drawings.

It should be noted that the thicknesses of lines and the sizes of components shown in the drawings may be exaggerated for simplicity and clarity of description. Also, it should be noted that the following terms are the ones defined in consideration of the functional characteristics of the present invention, and therefore, the meanings of the following terms may be changed according to an intension of a user or an operator or according to custom. Consequently, the definition of the following terms must be given based on the description made throughout the specification.

Figure 3:
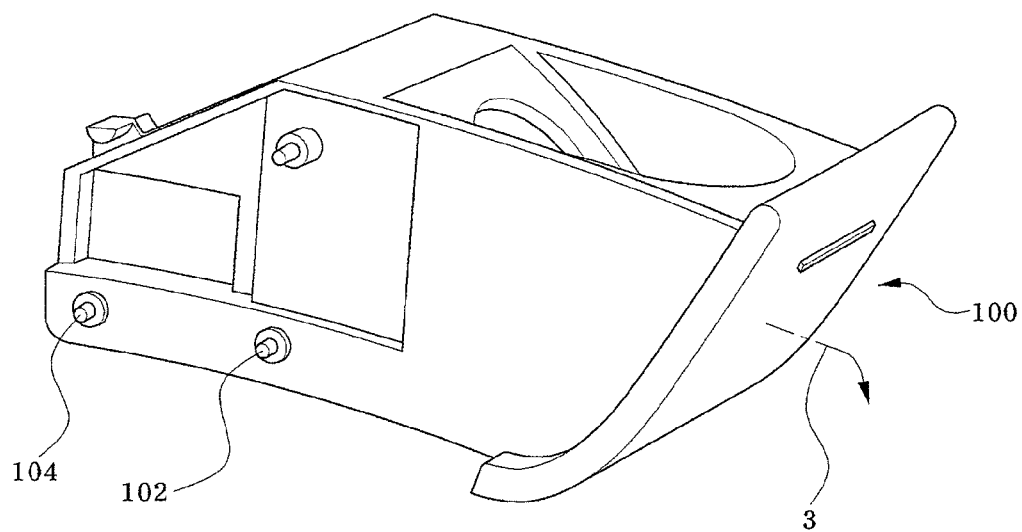
FIG. 3 is a perspective view illustrating an operating part, to which a rotary damper according to the present invention will be applied.
Figure 4:
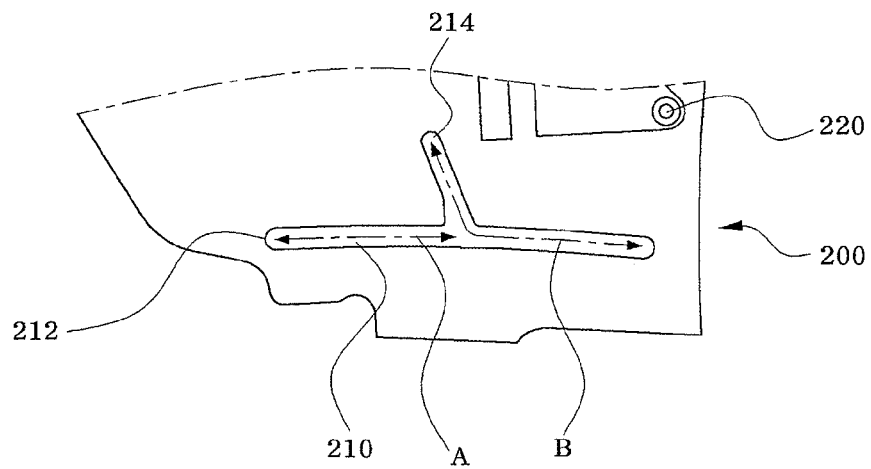
FIG. 4 is a perspective view illustrating an operating part case in which the operating part shown in FIG. 3 is operably mounted.

FIG. 3 is a perspective view illustrating an operating part 100, to which a rotary damper according to the present invention will be applied, and FIG. 4 is a perspective view illustrating an operating part case 200 in which the operating part 100 shown in FIG. 3 is operably mounted.

The operating part 100, for example, a power outlet, is constructed in a structure in which the operating part 100 is introduced into and withdrawn from the operating part case 200. Also, the operating part 100 has a complex track 3, along which the operating part 100 is linearly moved forward and is then rotated downward for a user's convenience.

Specifically, protrusions 102 and 104 are formed at opposite sides of the operating part 100, as shown in FIG. 3, and guide grooves 210 are formed at opposite sides of the operating part case 200 such that the protrusions 102 and 104 can be guided along the corresponding guide grooves 210, as shown in FIG. 4.

The front protrusions 102 are moved along a track indicated by A in the guide grooves 210 (i.e., the first branch of the continuous groove), and the rear protrusions 104 are moved along a track indicated by B in the guide grooves 210. The operating part 100 is pushed forward by a spring (not shown) mounted at the rear of the operating part 100. When the front protrusions 102 of the operating part 100 are brought into contact with the front ends 212 of the guide grooves 210 of the operating part case 200, the rear protrusions 104 of the operating part 100 are raised along side grooves 214 (i.e., the second branch of the continuous groove) of the operating part case 200, which are connected with the guide grooves 210.

Consequently, the operating part 100 is moved forward and is then rotated downward.

Figure 2:
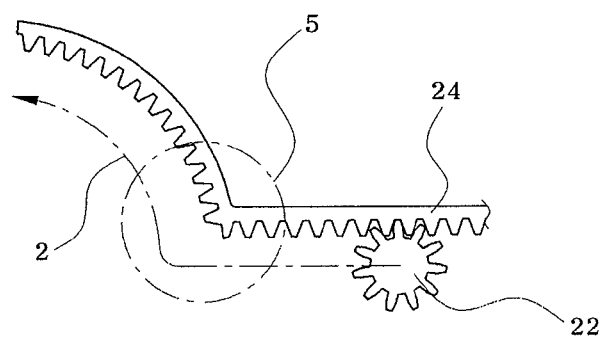
FIG. 2 is a view illustrating the construction of another conventional damper having a complex track.

If the conventional damper as shown in FIG. 2 is used in the case that the operating part 100 has the above-described complex track, however, it is not possible to uniformly control the operating speed of the operating part at the time when after the operating part 100 is linearly moved and then enters the rotating section.

Figure 5:
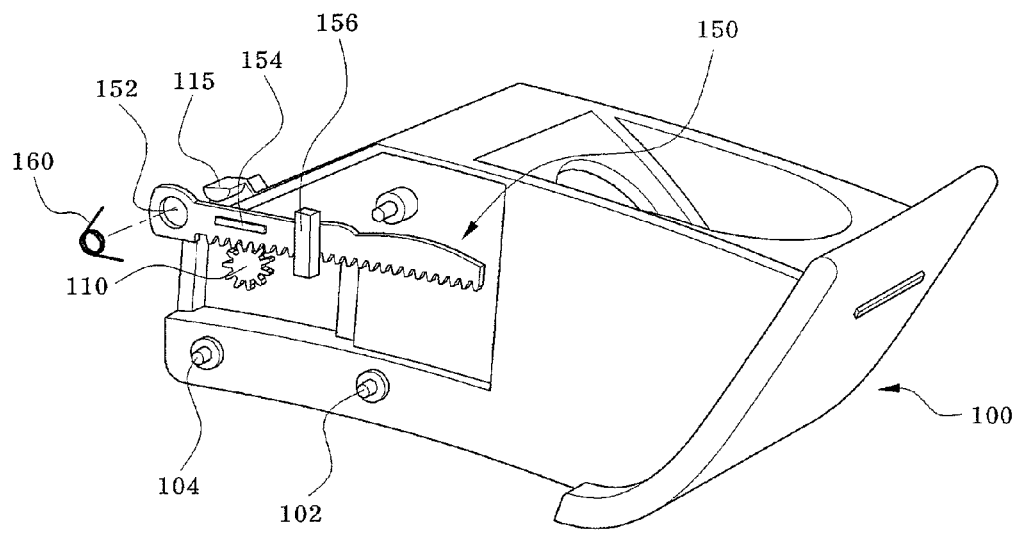
FIG. 5 is a perspective view illustrating an operating part, to which a rotary damper according to a preferred embodiment of the present invention is mounted.

FIG. 5 is a perspective view illustrating an operating part, to which a rotary damper according to a preferred embodiment of the present invention is mounted.

As shown in FIG. 5, the rotary damper according to the preferred embodiment of the present invention includes a pinion gear 110 mounted to the operating part 100 and a guide rail 150 rotatably mounted to the operating part case 200 such that the pinion gear 110 can be engaged with the guide rail 150.

The guide rail 150 is provided at one end thereof with a rotary shaft hole 152, through which a rotary shaft 220 formed at the operating part case 200 (see FIG. 4) is rotatably inserted. At the guide rail 150 is mounted an elastic member 160. The elastic member 160 provides an elastic force in the direction in which the guide rail 150 is brought into tight contact with the pinion gear 110 (in the clockwise direction on the drawing).

At one side of the operating part 100 is formed a guide protrusion 115 for supporting one end of the guide rail 150 such that the guide rail 150 cannot be separated from the pinion gear 110. Although the guide rail 150 is brought into tight contact with the pinion gear 110 due to the elastic force of the elastic member 160, the guide protrusion 115 is preferably provided at one side of the operating part 110 so as to more securely constrain the guide rail 150.

Also, the guide rail 150 is provided with a frictional protrusion 154 for uniformly maintaining the distance between the guide rail 150 and the operating part case 200 and reducing a frictional force. The frictional protrusion 154 is formed at one side of the guide rail 150. By the provision of the frictional protrusion 154, the contact area between the guide rail 150 and the operating part case 200 is reduced, and therefore, a frictional force is reduced. Consequently, the guide rail 150 is smoothly moved.

Furthermore, the guide rail 150 is provided at a section where the pinion gear starts to move in a curvilinear form with a separation preventing protrusion 156. The separation preventing protrusion 156 serves to prevent the pinion gear 110 from being separated from the guide rail 150 at the position where the pinion gear 110 pushes the guide rail 150 upward. Specifically, the separation preventing protrusion 156 supports the outside surface of the pinion gear 110.

Figure 6:
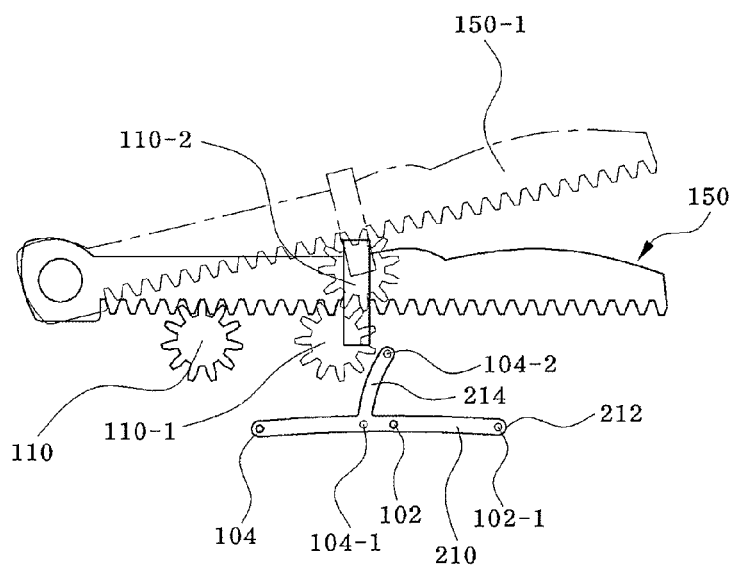
FIG. 6 is a side view illustrating the operation of the rotary damper according to the preferred embodiment of the present invention.

FIG. 6 is a side view illustrating the operation of the rotary damper according to the preferred embodiment of the present invention.

The drawing shows positions of the respective components depending upon the movement of the operating part. When the operating part is withdrawn from the operating part case, the operating part is linearly moved and is then rotated. The rotation of the operating part is performed about front protrusions 102.

When the operating part is linearly moved, the pinion gear 1109 is linearly moved along the guide rail 150 to a position indicated by 110-1. At this time, the front protrusions 102 are moved to a position indicated by 102-1, and the rear protrusions 104 are moved to a position indicated by 104-1. Until then, the guide rail 150 is not rotated.

As the front protrusions 102 are brought into contact with the front ends of the guide grooves 210, the rear protrusions 104 are moved from the position indicated by the 104-1 to a position indicated by 104-2 along the side grooves 214 while the front protrusions 102 are being maintained at the position indicated by 102-1. At this time, the pinion gear 110 pushes the guide rail upward to a position indicated by 150-1 while the pinion gear 110 is engaged with the guide rail 150.

Consequently, the pinion gear 110 is uniformly engaged with the guide rail 150 throughout the moving section, whereby it is possible to uniformly apply the damping force to the operating part, and therefore, it is possible to uniformly control the operating speed of the operating part.

As apparent from the above description, the rotary damper according to the present invention is constructed in a structure to uniformly maintain the moving speed of the operating part that is operated in a complex operation mode, and therefore, the operating efficiency and the sensitivity of the operating part are improved.

Although the preferred embodiments of the present invention has been disclosed for illustrative purposes, those skilled in the art will appreciate that various modifications, additions and substitutions are possible, without departing from the scope and spirit of the invention as disclosed in the accompanying claims.

What is claimed is:

1. A rotary damper, comprising:

an operating part having front protrusions and rear protrusions mounted in an interior of a vehicle in such a manner that the operating part can be introduced or withdrawn;

an operating part case that guides a path of the operating part, the operating part case having protrusion guide grooves engaging the front protrusions and the rear protrusions of the operating part, each protrusion guide groove comprising a continuous groove having first and second branches;

a pinion gear mounted to one side of the operating part, the pinion gear moves in a linear path and a curvilinear path; and a guide rail rotatably mounted to the operating part case such that the pinion gear is engaged with the guide rail, wherein a separation preventing protrusion is fixedly provided on the guide rail at a portion of the guide rail where the pinion gear starts to move in the curvilinear path while the operating part is being introduced or withdrawn, the separation preventing protrusion supports an outer surface of the pinion gear as the pinion gear starts moving in the curvilinear path, wherein when the operating part is withdrawn, the front protrusions and rear protrusions linearly move along the first branch of the continuous groove, and as the operating part is rotated about the front protrusions, the rear protrusions curvilinearly move along the second branch of the continuous groove, and wherein as the rear protrusions curvilinearly move, the pinion gear drives the rotatably mounted guide rail upward in the curvilinear path.

2. The rotary damper according to claim 1, wherein the operating part is provided with a guide protrusion that guides the guide rail such that the guide rail cannot be separated from the pinion gear.

3. The rotary damper according to claim 1, further comprising:
   an elastic member that provides an elastic force in the direction in which the guide rail is brought into tight contact with the pinion gear.

4. The rotary damper according to claim 1, wherein the operating part case is provided with a rotary shaft, and the guide rail is provided with a rotary shaft hole, the rotary shaft being rotatably inserted through the rotary shaft hole.

5. The rotary damper according to claim 1, wherein the guide rail is provided with a frictional protrusion protruding toward the operating part case.

* * * * *